United States Patent
Wang et al.

(10) Patent No.: US 9,380,515 B2
(45) Date of Patent: Jun. 28, 2016

(54) WIRELESS COMMUNICATIONS APPARATUS, A METHOD AND A COMMUNICATION SYSTEM FOR PERFORMING RELAY SELECTION

(71) Applicant: Kabushiki Kaisha Toshiba, Tokyo (JP)

(72) Inventors: Yue Wang, Bristol (GB); Justin Coon, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 163 days.

(21) Appl. No.: 13/890,554

(22) Filed: May 9, 2013

(65) Prior Publication Data

US 2013/0315133 A1    Nov. 28, 2013

(30) Foreign Application Priority Data

May 11, 2012    (GB) .................................. 1208295.4

(51) Int. Cl.
*H04W 40/22*    (2009.01)
*H04W 40/12*    (2009.01)
(Continued)

(52) U.S. Cl.
CPC .............. *H04W 40/22* (2013.01); *H04W 40/12* (2013.01); *H04B 7/2606* (2013.01); *H04W 88/04* (2013.01)

(58) Field of Classification Search
USPC ........................................................ 455/11.1
See application file for complete search history.

(56) References Cited

U.S. PATENT DOCUMENTS 8,050,618 B2 *   11/2011   Kwun et al. ...................... 455/7
2007/0165581 A1 *   7/2007   Mehta et al. .................. 370/338

(Continued)

FOREIGN PATENT DOCUMENTS

CN        101394665        3/2009
JP        2002-290306 A    10/2002
(Continued)

OTHER PUBLICATIONS

Rodoplu, Volkan, and Teresa H. Meng. "Minimum energy mobile wireless networks." Selected Areas in Communications, IEEE Journal on 17.8 (1999): 1333-1344.*

(Continued)

*Primary Examiner* — Yuwen Pan
*Assistant Examiner* — Zhitong Chen
(74) *Attorney, Agent, or Firm* — Oblon, McClelland, Maier & Neustadt, L.L.P.

(57) ABSTRACT

The embodiments relate to a wireless communications apparatus configured to operate as one of a source node, a relay node or a destination node in a network comprising a plurality of source nodes, relay nodes and destination nodes configured to support dual-hop communication using one of said relay nodes to intercede between one of said source nodes and one of said destination nodes, and a method for selecting a relay node. The wireless apparatus is configured to collect channel characteristics between the intended source node and each relay node, and between each relay node and the intended destination node, and select a relay node for relaying a signal emitted by the intended source node by determining a mode of operation for performing the selection on the basis of collected channel characteristics. The wireless communication apparatus is further configured to change the mode of operation to a different one if the channel characteristics change. The mode of operation of performing the relay node selection is one of a first mode and a second mode. In the first mode; the relay node is selected on the basis of said channel characteristics between the intended source node and each relay node and in the second mode; the relay is selected on the basis of said channel characteristics between each relay node and the intended destination node.

18 Claims, 7 Drawing Sheets

(51) Int. Cl.
  *H04W 88/04*  (2009.01)
  *H04B 7/26*  (2006.01)

(56) References Cited

U.S. PATENT DOCUMENTS

2007/0190934 A1* 8/2007 Kim et al. .......... 455/7
2007/0213065 A1* 9/2007 Kang et al. .......... 455/442
2011/0256828 A1 10/2011 Hsu et al.
2013/0294331 A1* 11/2013 Wang et al. .......... 370/315

FOREIGN PATENT DOCUMENTS

| | | |
|---|---|---|
| JP | 2007-74304 A | 3/2007 |
| JP | 2010-501140 A | 1/2010 |
| JP | 2010-109915 A | 5/2010 |
| WO | WO 2008/042192 A1 | 4/2008 |
| WO | WO 2008/051061 A1 | 5/2008 |
| WO | WO 2008/105771 A1 | 9/2008 |
| WO | WO 2010/019082 A1 | 2/2010 |

OTHER PUBLICATIONS

Bletsas, Aggelos, et al. "A simple cooperative diversity method based on network path selection." Selected Areas in Communications, IEEE Journal on 24.3 (2006): 659-672.*

Suwen Wu, et al., "A Statistic Channel Information-based Relay Selection Scheme in Cooperative Networks", 2009 Flobal Mobile Congress, Oct. 2009, 6 pages.

United Kingdom Search Report Issued Sep. 7, 2012, in Great Britain Patent Application No. 1208295.4, filed May 11, 2012.

* cited by examiner

WIRELESS COMMUNICATIONS APPARATUS, A METHOD AND A COMMUNICATION SYSTEM FOR PERFORMING RELAY SELECTION

FIELD

Embodiments described herein relate generally to a wireless communication apparatus, communication system and method for performing relay node selection.

BACKGROUND

In many wireless communication systems there exist a system model where a source node communicates with a destination node via the assistance of one or multiple relay nodes. In an environment where there are multiple relays available, one can select a single relay from all the available relays to transmit the signal. Such a technique, referred to as relay selection, has been shown to effectively achieve the diversity order offered by using all the available relays. In some circumstances, the channel characteristics from the source to the relays and from the relays to the destinations can be quite different.

In practical dual hop systems with relay selection, there are different protocols that the relays can follow to assist the transmission from the source to the destination. The most popular ones are amplify-and-forward and decode-and-forward. For amplify-and-forward, the relay nodes receive the signal from the source, amplify it with some gain (either a fixed value or a variable value according to instantaneous channel gain), and then forward the amplified signal to the destination. For decode-and-forward, the relay nodes detect the received signal from the source, and then forward the detected signal to the destination. Both protocols have their pros and cons. For example, decode-and-forward results in a higher complexity relay node compared to amplify-and-forward, but can usually provide a better performance.

There are different modes of operation for selecting the relay to transmit the signal from the source to the destination. Most of the current systems either use a first mode i.e. forward selection; where selection is made based on instantaneous channel characteristics between the source and relay, or a second mode i.e. backward selection; where selection is made based on instantaneous channel characteristics between the relay and the destination. Whether forward selection or backward selection is used is decided at the beginning of system initialization, based on the channel conditions at the time of selection. Existing systems do not take into consideration changes to the channel conditions that can occur during a transmission. Once the selection scheme is decided at system initialization, it is fixed all through the transmission, regardless of the changing channel conditions. In other words, in most of the current systems, when it is decided to perform forward selection, will continue so without considering the varying channel statistics even if other modes of operation favours the transmission when channel conditions change.

There is therefore a desire for an intelligent system that is able to adapt the relay selection schemes according to the variation of the channel characteristics.

DETAILED DESCRIPTION

Figure 1:
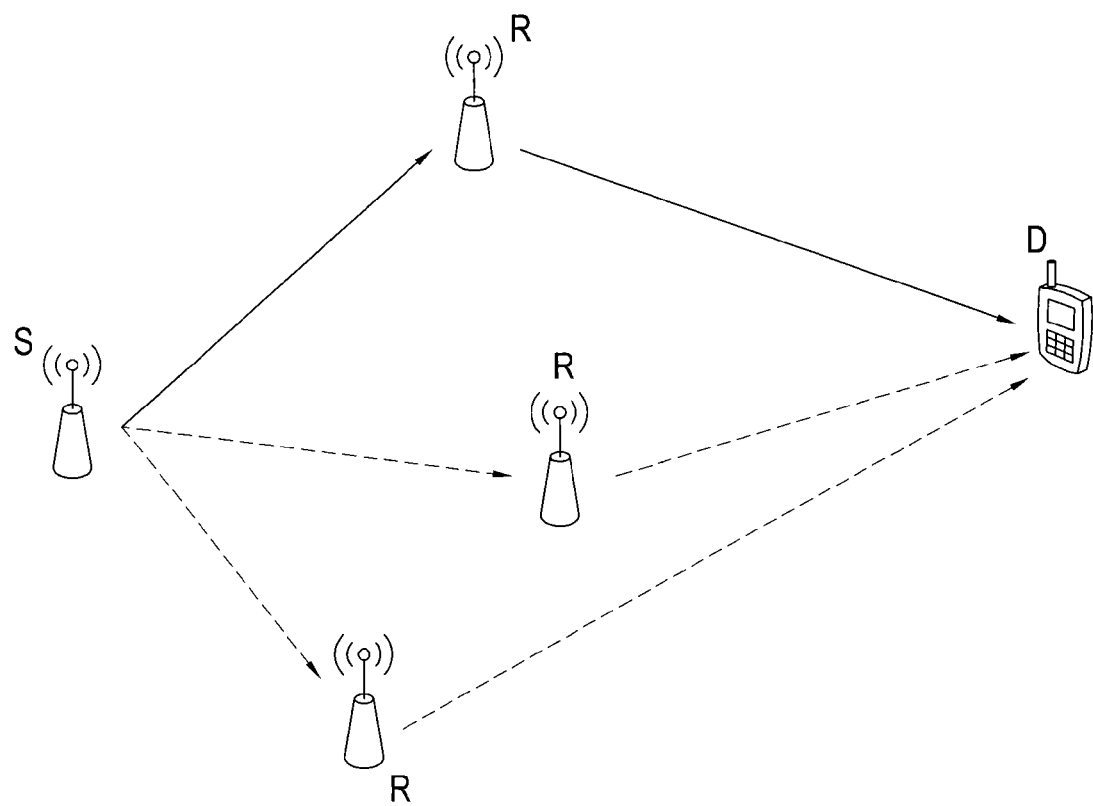
FIG. 1 shows an example of a dual-hop communication system in which one of many existing relays can be selected for a transmission from a source to a destination.

One aspect of the embodiments described in this application a wireless communication apparatus, communication system and method for performing relay node selection by proposing a mechanism for an intended source node, the relay nodes and the intended destination node to switch from one mode of operation for performing relay node selection to another when necessary.

According to one embodiment, there is provided a wireless communications apparatus configured to operate as one of a source node, a relay node or a destination node in a network comprising a plurality of source nodes, relay nodes and destination nodes configured to support dual-hop communication using one of said relay nodes to intercede between one of said source nodes and one of said destination nodes, the apparatus comprising:

channel characteristics collecting means operable to collect channel characteristics between the intended source node and each relay node, and between each relay node and the intended destination node, said channel collecting means comprising a processing means operable to process one or more received signals to obtain statistical channel information, said statistical channel information being the collected channel characteristics for determining a mode of operation for selecting a relay node to relay a signal emitted by the intended source node, and for changing the mode of operation to a different mode if the collected channel characteristics change; and/or mode determining means operable to determine a mode of operation for selecting a relay node to relay a signal emitted by the intended source node, said mode determining means being operable to determine the mode of operation on the basis of collected channel characteristics from the/a channel characteristics collecting means, the channel characteristics including statistical channel information, and being further operable to change the determined mode of operation to a different mode if the channel characteristics change; and/or relay node selecting means for selecting a relay node to relay a signal emitted by the intended source node, the mode of operation of said relay mode selecting means being determined by the/a mode determining means on the basis of collected channel characteristics from the/a channel characteristics collecting means, the channel characteristics including statistical channel information; the mode of operation being changed by the mode determining means to a different mode if the collected channel characteristics change;

wherein the mode of operation for selecting the relay node is one of a first mode and a second mode where in the first mode, said relay node is selected on the basis of channel characteristics between the intended source node and each relay node; and in the second mode, said relay node is selected on the basis of channel characteristics between each relay node and the intended destination node.

In a further embodiment, there is provided a communication system comprising a network having a plurality of source nodes, relay nodes and destination nodes configured to support dual-hop communication using one of said relay nodes to intercede between one of said source nodes and one of said destination nodes, the system including a wireless communications apparatus as set out above, the apparatus configured to operate as one of a source node, a relay node or a destination node.

In a further embodiment, there is provided a method of performing relay node selection for relaying one or more signals emitted from an intended source node to an intended destination node in a network having a plurality of source nodes, relay nodes and destination nodes configured to support dual-hop communication using one of said relay nodes to intercede between one of said source nodes and one of said destination nodes, the method being implemented by a wireless communication apparatus as set out above, the apparatus configured to operate as one of a source node, a relay node or a destination node, the method comprising the steps of:

a) collecting channel characteristics between the intended source node and each relay node and between the intended destination node and each relay node by obtaining statistical channel information from one or more received signals;

b) selecting a relay node for relaying a signal emitted by the intended source node by determining a mode of operation on the basis of the collected channel characteristics, the mode of operation being one of a first mode and a second mode, where in the first mode, the relay node is selected on the basis of said channel characteristics between the intended source node and each relay node; and in the second mode, the relay is selected on the basis of said channel characteristics between each relay node and the intended destination node;

c) changing the determined mode of operation if the channel characteristics between the intended source node and each relay node and/or the channel characteristics between the intended destination node and each relay node changes.

In practical dual-hop systems with relay selection, an example of which is shown in FIG. 1, the relay can be selected such that the instantaneous end-to-end SNR (the Signal to Noise Ratio from the source to the relay to the destination) is maximized. Such a selection method, sometimes referred to as dual-hop selection or global selection, requires instantaneous information regarding channel characteristics or channel conditions, such as channel state information (CSI) at both channel hops—from the source to the relay, as well as from the relay to the destination. This is referred to as the global channel knowledge.

In some other cases where the source has the knowledge of the channel characteristics or conditions such as the CSI of the channels from source to the relays, the source selects a relay such that the SNR between the source and the relay (the first hop) is maximized. Once that relay is selected, it is employed to transmit data from the relay to the destination, regardless of the channel condition at the second hop between the relay and the destination. Such a selection method is referred to as forward selection or a first mode of operation wherein instantaneous channel characteristics between the source and relay are used to make a selection. In some other cases only the destination has the knowledge of the channel characteristics or conditions such as CSI from all the relays to the destination therefore it selects a relay such that the SNR from this relay to the destination is maximized, regardless of the channel condition at the first hop. Such a selection method is referred to as backward selection or a second mode of operation wherein instantaneous channel characteristics between the relay and destination are used to make a selection. Although dual-hop selection provides the best performance amongst the three selection techniques described above, it has the highest complexity and signalling requirements and overheads as either the source or the destination needs to have knowledge of CSI at both hops. The complexity of using the first mode of selection or the second mode of selection is similar, requiring the estimation of the CSI of M channels where M is the number of intermediary relays. The terms first mode of operation and second mode of operation are used in this application to refer to forward selection and backward selection techniques, respectively, that are described above.

Outage probability is an important metric when evaluating performance of a practical system. It tells how likely the transmission is going to fail therefore is desired to be minimized when considering reliable transmission as the goal. Outage probability performance due to the use of different selection schemes can be quite different, according to different channel characteristics.

Forward selection and backward selection schemes are existing techniques that have been extensively discussed in the literature. Studies have shown that the outage probability performance due to the use of different selection schemes can be quite different, according to different channel conditions and characteristics.

The embodiments described herein describe the use of either the first mode of operation or the second mode of operation according to channel characteristics at both hops or stages such that the outage probability is minimized. The Embodiments propose a self-organizing relay network where the source or the destination can choose first mode or second mode according to the changing channel characteristics.

The embodiments herein described focus on the techniques for fixed-gain amplify-and-forward network due to its simplicity as well as the other advantages such as providing a higher diversity gain than decode-and-forward when, for example, distributed space-time block codes are considered. However, the claimed embodiments are not limited to such systems and can operate in other types of relay systems as well.

It is known that for a fixed-gain dual-hop relay system where a single relay is selected to assist the transmission from the source to the destination, selecting the relay according to the first mode or a second mode of operation can yield different performance in terms of outage probability and diversity order.

Figure 2A:
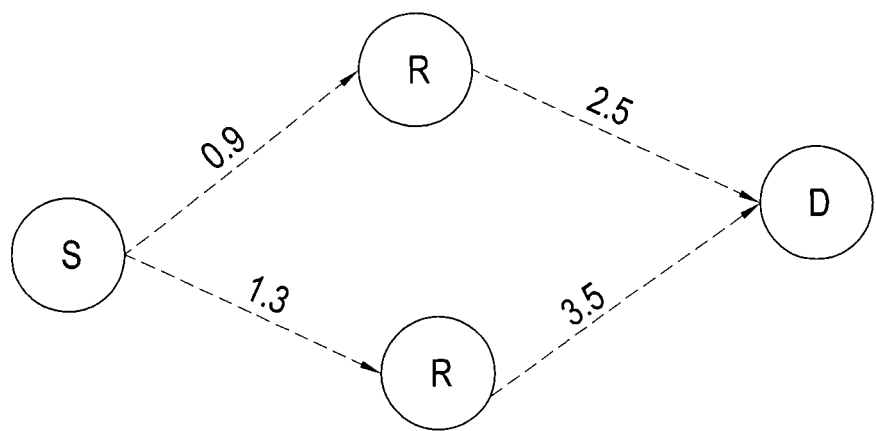
FIG. 2a shows an example of a dual-hop relay network with different channel characteristics where selection using a first mode of operation (forward selection) is preferred, in an embodiment when all channels are subject to Nakagami-m fading.
Figure 2B:
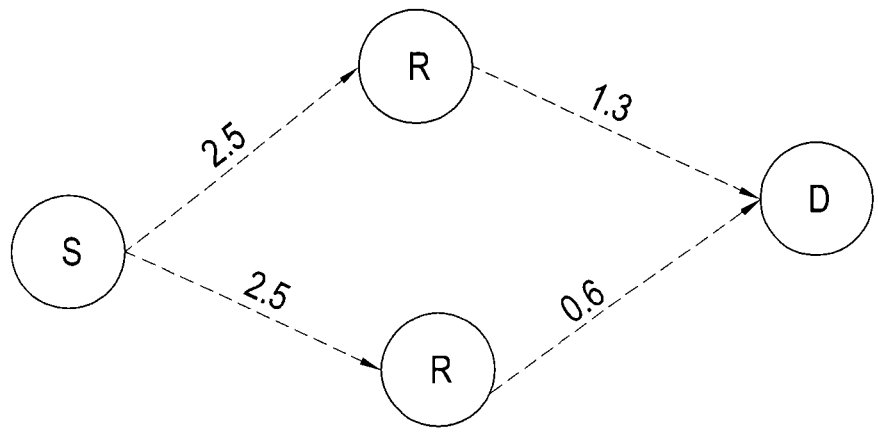
FIG. 2b shows an example of a dual-hop relay network with different channel characteristics where using a second mode of operation (backward selection) is preferred, in an embodiment when all channels are subject to Nakagami-m fading.
Figure 3A:
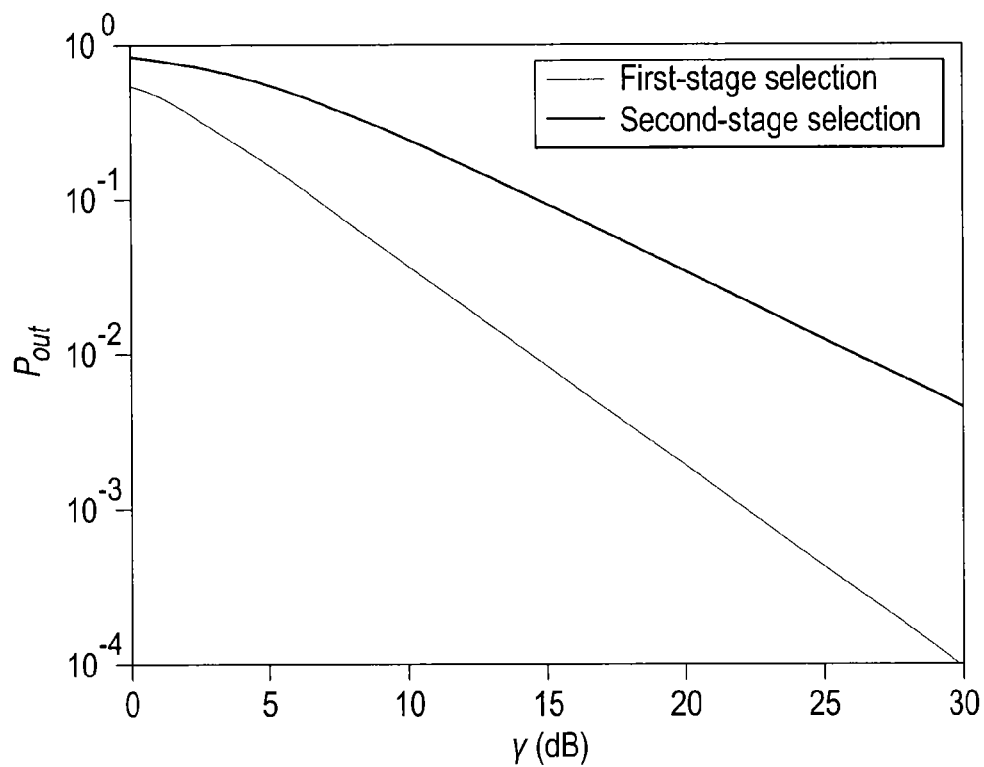
FIG. 3a shows the outage probability of the example network shown in FIG. 2a when using the first mode and the second mode.
Figure 3B:
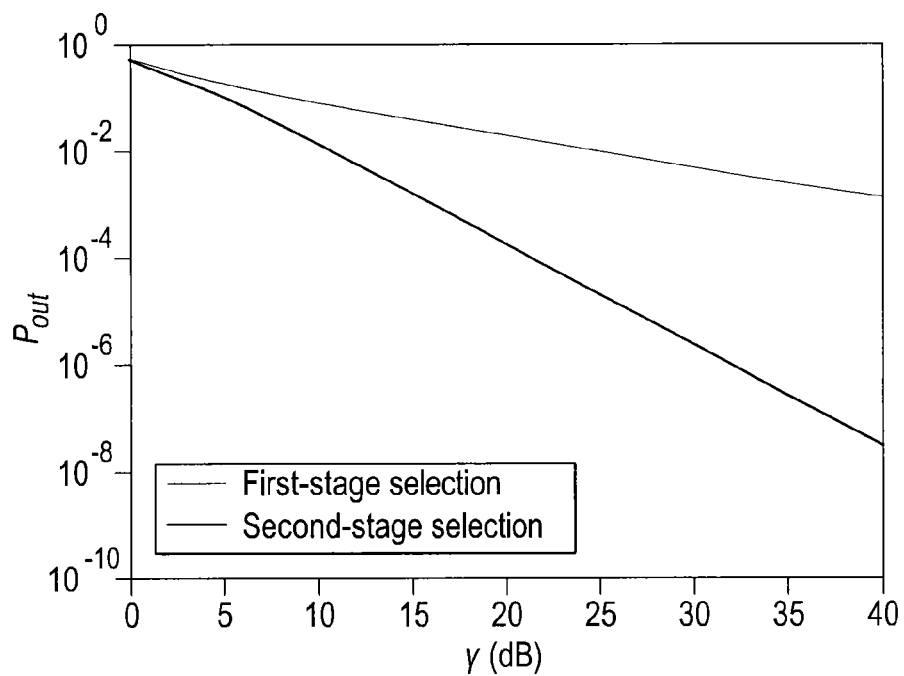
FIG. 3b shows the outage probability of the example network shown in FIG. 2b when using the first mode and the second mode.

For example, in the dual-hop network given in FIG. 2a where all channels subject to Nakagami-m fading with different fading parameters (indicated by the number on top of the channel which is the shape parameter of the Nakagami-m fading), it is known from that in such a case performing a first mode of operation yields a diversity order of 2.2 while performing a second mode of operation yields a diversity order of 0.9. In addition, the outage probability for such a network due to the first mode of operation or the second mode of operation is illustrated in FIG. 3a, where obviously the first mode of operation yields substantial advantages in terms of outage gain. In another example when the Nakagami channels are shown as given in FIG. 2b, the diversity orders with the first mode and the second mode are 0.6 and 1.9, respectively, and the corresponding outage probability performance is shown in FIG. 3b, where obviously one would choose to use the second mode rather than the first mode to achieve an improved outage probability. In the case when the channel fading parameters change from those illustrated in FIG. 2a to those illustrated in FIG. 2b, due to, for example, node mobility, it is desired that the relay system switches from the first mode to the second mode to avoid significant performance drop in terms of outage probability.

The embodiments provide a wireless communications apparatus that is configured to change a mode of operation from a first mode to a second mode, and vice-versa based on changing channel characteristics. The apparatus may be a source node, a relay node or a destination node in a network that supports dual-hop communication and having a plurality of source, relay and destination nodes. One or more of the source, relay and destination nodes can be implemented as the wireless communication apparatus according to this embodiments. Therefore, if the apparatus is configured to be the source—the relay nodes and destination node may or may not be implemented as the wireless communication apparatus according to the present embodiment, and could be implemented as conventional relay nodes or destination nodes.

The wireless communication apparatus according to the embodiments disclosed herein can take on one or more of three possible roles, yielding three types of nodes: collecting nodes, decision nodes and action nodes. Source and relay nodes can be any of these types, while destination nodes can act as collecting and/or decision nodes only.

Figure 7:
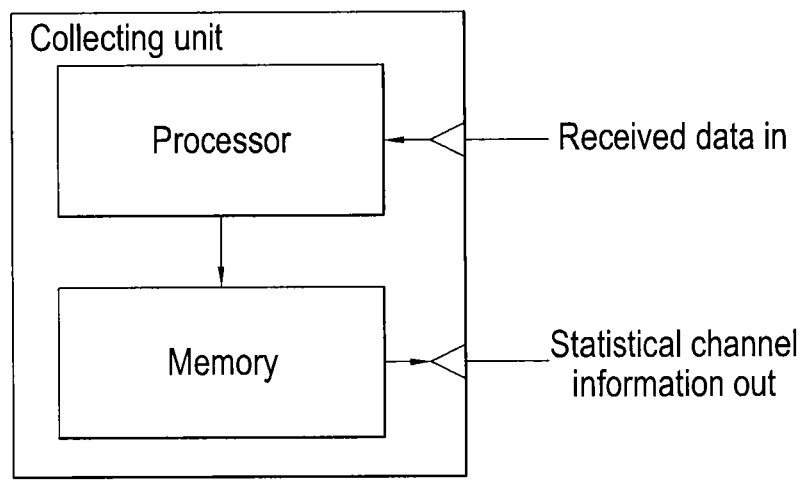
FIGS. 7 and 8 are example implementations of the wireless communications apparatus in an embodiment where the apparatus is a collecting node.
Figure 8:
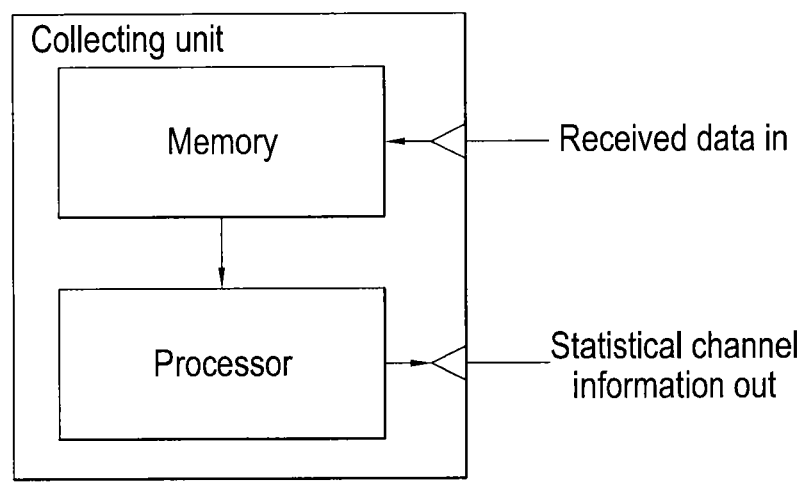

A collecting node includes channel characteristics collecting means that is capable of collecting statistical information about the prevailing channel conditions. Statistical channel information includes the mean channel gains, the channel distributions, and the distributional parameters such as shape parameters, which define the inherent diversity in the channels. The channel characteristics collecting means is capable of receiving one or more signals using a receiving unit to access channel conditions. The collection is done using a collecting unit locating within the node. The collecting node reads (analogue or digital) received signals into its collecting unit. The signals can be stored in a memory module or processed to extract statistical channel information in the collecting unit. This refers to long term statistical knowledge regarding the statistical channel distributions collected rather than instantaneous channel information. In the former case, the data is read from memory at an appropriate time and processed to extract statistical channel information. In the latter case, the extracted information is stored in a memory module for further use at a future time. Illustrations of these two collecting unit architectures are depicted in FIGS. 7 and 8.

A decision node possesses a mode determining means that reads in the statistical channel information generated by the collecting unit in the collecting node and takes a decision regarding which relay selection approach out of the possibilities of forward and backward selection (first mode and second mode, respectively) should be implemented. This decision may then be conveyed to the action node. If the collecting node and the decision node are different nodes in different geographic locations, a control channel is used to convey the statistical channel information from the collecting node to the decision node. Similarly, if the decision node and the action node are different nodes in different geographic locations, a control channel is used to convey the relay selection decision from the decision node to the action node.

An action node possesses a relay node selecting means that uses the relay selection decision made by the decision node i.e. the mode determining mean's determination of whether the first mode or second mode is to be used, to select a relay using the most appropriate method of implementing the chosen relay selection mode, and then implements relay selection based on instantaneous channel conditions.

For the case where a source node is an action node, it can choose to communicate with the chosen relay by only communicating on the logical channel that said relay is tuned to. Examples of such a logical channel include, but are not limited to, a predetermined frequency channel or a predetermined time slot.

For the case where a relay node is an action node, a source may broadcast its message to all relay nodes, where only the selected relay action node forwards said message to a destination node. In this case, the other relay nodes may be action nodes as well, where the action carried out by those nodes, which is based on the relay selection decision conveyed from the decision node, would be to refrain from forwarding the message that was transmitted by the source.

Therefore, the wireless communication apparatus according to the embodiments may include one of:

a channel characteristics collecting means that is configured to collect channel characteristics from both channel hops i.e. from an intended source node to the relay nodes and from the relay nodes to the intended destination node. This will allow it to behave as a collecting node. These means may be implemented as a collecting unit or a circuit configured to collect and store channel characteristics. The statistical distribution of the channel (i.e., statistical channel information) is used to choose whether the first mode or the second mode of relay selection is employed;

a mode determining means, which could be implemented as control circuit, and operable to determine whether to use a first mode or a second mode of operation, based on the channel characteristics collected by the channel collecting means. Furthermore, the mode determining means is configured to change the mode operation if it determines that the channel characteristics change. This allows the apparatus to behave as a decision node. For instance, if initially the collected statistical channel information favours a first mode of operation, the mode selection means determines that a first mode of operation is to be used i.e. forward selection is performed and a relay node is selected based on the instantaneous channel characteristics between the intended source and the relay nodes. During transmission, if the collected statistical channel information changes such that the first mode is no longer favoured, then the mode determining means is configured to identify this and switch the mode of operation to the other mode i.e. the second mode of operation. Therefore, following the change in channel characteristics, the apparatus is operable to change the relay selection technique from the first mode initially determined to a second mode. In the second mode the relay node selection is based on the instantaneous channel characteristics between the relay nodes and the destination nodes;

a relay node selecting means that is configured to select a relay for relaying a signal from a source node to a destination node using instantaneous channel conditions to make the relay selection. The relay node selecting means is configured to implement relay selection using the mode of operation determined based on statistical channel information by a mode determining means. This allows the apparatus to behave as an action node. The relay is then selected using the determined mode using instantaneous channel characteristics.

The mode determining means is preferably configured to change the mode of operation for performing relay node selection based on the outcome of a criterion. The switch between different modes of operation can be done through the cooperation among source nodes, relay nodes, and destination nodes, one or more of which are implemented to be a wireless communication apparatus according to the present embodiment. The embodiments further provide a criterion for performing either first mode or the second mode according to varying channel statistic information with generalized fading characteristics (for example, mixed Nakagami-m and Rician channels).

The criterion for choosing between the first mode and the second mode can be based on performance or complexity consideration, energy consideration. The criterion need not be a single one and the switching can be based on the outcome of a combination of different criteria. Examples of these criteria that may be used by the mode determining means to determine a mode of operation are explained as follows:

Performance Considerations:

1. When taking into consideration outage probability considerations: The first mode is performed if $$\text{Pout\_1} < \text{Pout\_2}$$

where Pout_1 and Pout_2 are the outage probabilities due to the first mode and the second mode, respectively. The outage probabilities may be computed using known methods such as method provided in "Outage Probability of Fixed-Gain Amplify-and-Forward Dual-Hop Relay systems with Relay Selection over Generalized fading Channels" submitted to the Annals of Telecommunications (Springer), 2012. Similarly, the second mode is performed if $$\text{Pout\_2} < \text{Pout\_1}.$$

2. Diversity order considerations in Nakagami-m fading channels: For a dual-hop network where all channels experience Nakagami-m fading, the first mode is performed if $$d_1 > d_2$$

where $d_1$ and $d_2$ are the diversity orders due to first mode and the second mode, respectively. In particular, $$d_1 = \min\left(\sum_{n=1}^{N} m_{1n}, m_{21}, m_{22}, \ldots m_{2N}\right)$$

$$d_2 = \min\left(\sum_{n=1}^{N} m_{2n}, m_{11}, m_{12}, \ldots m_{1n}\right)$$

where N is the number of relay nodes that can be selected, and $m_{1n}$, $m_{2n}$, are the shape parameters of Nakagami-m fading channels at the first hop and the second hop to or from the nth relay, respectively. Take the example in FIG. 2a, the corresponding parameters are $m_{11}=0.9$, $m_{12}=1.3$, $m_{21}=2.5$, $m_{22}=3.5$.

3. Diversity order considerations Nakagami and Rician channels: For a dual-hop network where some links experience Rician-Rician fading while others experience Nakagami-Nakagami fading, and the selection among the relays where the source-relay-destination channels are Nakagami-Nakagami fading according to the criterion given in 2 above (through first mode or the second mode) yields a diversity order of d. Relay selection is performed among those with the Nakagami-Nakagami fading channels if $$d > 1$$

or selection is performed among the relays with the Rician-Rician fading channels if $$d < 1.$$

Figure 4:
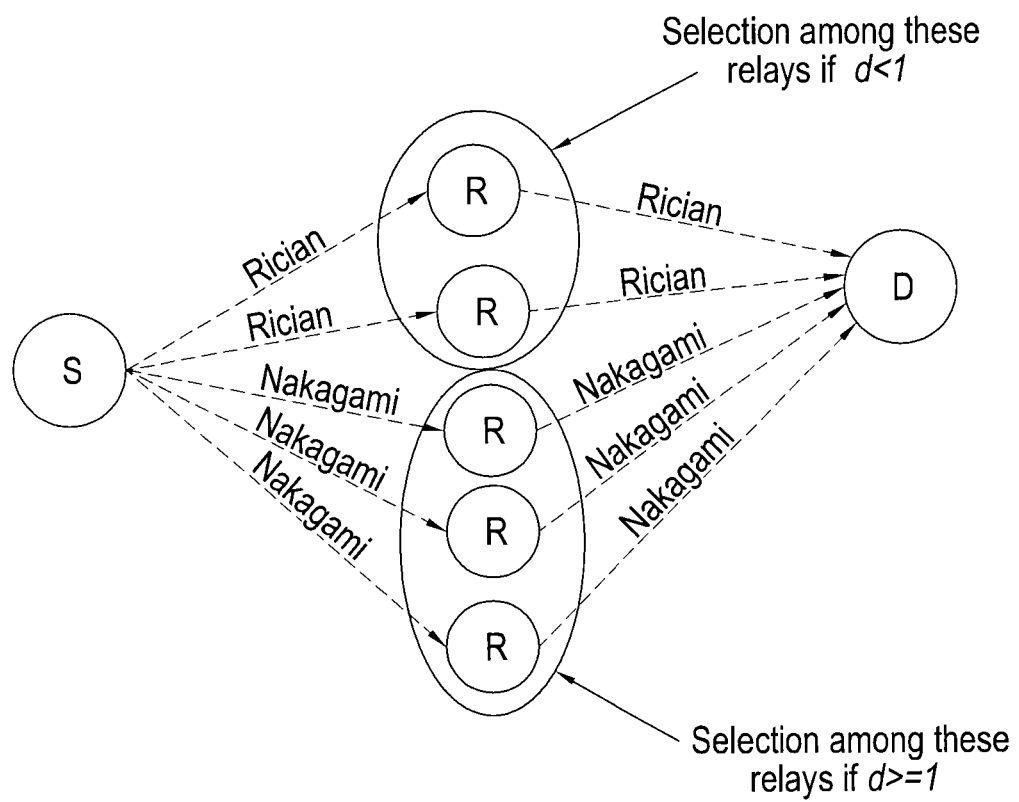
FIG. 4 shows an example of relay selection in an embodiment when some channels are subject to Nakagami-m fading and some are subject to Rician fading.

An illustration this scenario described in 3 is given in FIG. 4.

The criteria given above are examples only, and other condition may be used to decide which mode of operation is favoured. The outage probabilities and diversity orders vary according to different combinations of channel characteristics at both hops, and the selection should be done according to different scenarios.

A simple example of when one would encounter different channel fading models is that when the channel from the source to one relay has a line of sight component while the channels from the source to the other relays do not have that line of sight component, resulting in a Rician channel for one link and Rayleigh channels for the other links.

The fading channel model and their statistics can be obtained through measurement. In particular, the use of Expectation-Maximization (EM) algorithm and Kalman Filtering can be used for wireless channel modelling and parameter estimation.

Complexity Considerations:

Instantaneous channel characteristics or conditions such as the CSI of the N channels from the source to the relays is required to be estimated to perform the first mode, while the CSI from relays to the destination is required to be estimated in order to perform the second mode.

There are different ways of signal exchange among source, relays and destination according to different system setups. The wireless communication apparatus is implemented as one or more of the source node, destination node and/or relay node. Some examples of signal exchanges are described below:

In the case of the first mode a) If the relays are not allowed to cooperate, the source sends sounding signals to the relays, the relays estimate the channels and feedback the channel information if frequency division duplex (FDD) is used. In this case, the collecting nodes are the relay nodes. If time division duplex (TDD) is used, then channel reciprocity is used instead for this estimation, and the source node acts as the collecting node. The source makes a decision of which relay to select, transmits signal to that relay for it to forward the message to the destination if the channels from the source to the relays are orthogonal (in the time, frequency, or spatial domain). In this situation, the source node also acts as the decision node and action node. Alternatively, the source broadcasts the signal to all relays including the index of the relay it selected; only the selected relay then acts as an action node and forwards the amplified signal to the destination through orthogonal channels. This can be achieved in, e.g., LTE-Advanced by assigning different relays orthogonal (i.e., different) resource blocks.

b) If the relays are allowed to cooperate, the source sends sounding signals to the relays, the relays estimate the channels, talk to each other, and decide which relay should be selected. This selected relay then sends a request to the source and at the same time broadcast to the other relays for them to remain silent, the source then sends signals to that relay and the relay amplifies the signal and forwards it to the destination.

In the case of the second mode:

a) The source broadcasts the signal to all relays, the relays send sounding signals to the destination using orthogonal channels (orthogonal in the time, frequency or space domain), the destination estimates the channel and makes a decision of which relay to select, receives signal from this relay while not the others (if the channels are orthogonal), or feedbacks this information to the relays so that they know they should be transmitting data or not, and the relay that is selected then transmits the signal and the other relays will be deactivated for this transmission.

b) In another scenario where the destination estimates the channels and decides which relay to select, and then requests this relay to send signals. The relay then in turn requests the source to send signals to it, receives the signal, and forwards it to the destination. All the other relays remain silent during the process after the sounding signals are sent to the destination.

The protocols described above are by way of examples only. Different protocols of selecting relays at the source or the destination can be used according to different system setup.

In some systems, in the case of FDD, the feedback required for the first mode is the CSI of the N channels from the source to the relays while this is not required for the second mode.

In some cases where it is desired to maintain low complexity at the source node (for example transmission from mobile User equipment (UE) to relays to cellular base station where mobile UE is the source node), the second mode is preferred as it does not require massive processing at the UE and avoids the additional channel feedback to the UE as it is usually not available.

In some other cases where the CSI is relatively easy to obtain at the source (for example transmission from cellular base station to relays to mobile UE where cellular base station is the source node), since the cellular base station usually needs to have CSI from relays for scheduling etc, there is no additional efforts of feeding back channel information due to relay selection, first-hop selection may be performed to avoid channel estimation of N channels at the UE.

The general criterion of determining which mode of operation for relay selection to use according to complexity considerations is therefore to perform the first mode if low complexity device at the destination is desired, or perform the second mode if low complexity device at the source is desired. Similar considerations apply to energy consumption, delay and overhead required due to feedback etc. For example, if the relays do not cooperate, the first mode requires the relays to estimate the channel and feedback the CSI to the source, which should be avoided if low complexity relays are desired.

Combined Considerations:

The factors mentioned above can be considered simultaneously to optimize the system. For example, in some systems it is desired that the outage probability is smaller than a certain value, and once that goal is achieved and maintained, outage probability is not of primary concern. In that case, the mode determining means of the apparatus according to the described embodiments can choose to use the first mode or the second mode to minimize the cost according to different application scenarios. For example, one can choose the selection scheme according to the following optimization problem min the amount of feedback s.t. $P_{out}$<outage threshold Therefore, the above considerations can be used to determine switching between first and second up to this defined threshold, following which such switching may no longer needed to optimize the system. Therefore if the mode determining means determines that a pre-defined further criterion is satisfied, then it is configured to make an arbitrary selection between first mode, second mode, or even a different further mode such as global selection or dual-hop selection mode. One would envisage that the combined considerations can be generally applied according to different systems and different application scenarios, which should not be limited only to the examples that are included this application.

Note that FDD was considered in the discussions above. In the case of time division duplex (TDD), channel reciprocity can be used to obtain information at the source instead of CSI feedback, the cost is delay instead of the amount of feedback.

Following is a description of the self-organizing mechanisms of the described embodiments of switching from the first mode to the second mode or from second mode to the first mode in the examples below according to one of the scenarios described above.

Self-Organizing Mechanism:

Given below are some examples of how the switching may be implemented according to the embodiments described when one or more of the wireless communications apparatus is the source node and/or the relay node and/or the destination node.

Figure 5:
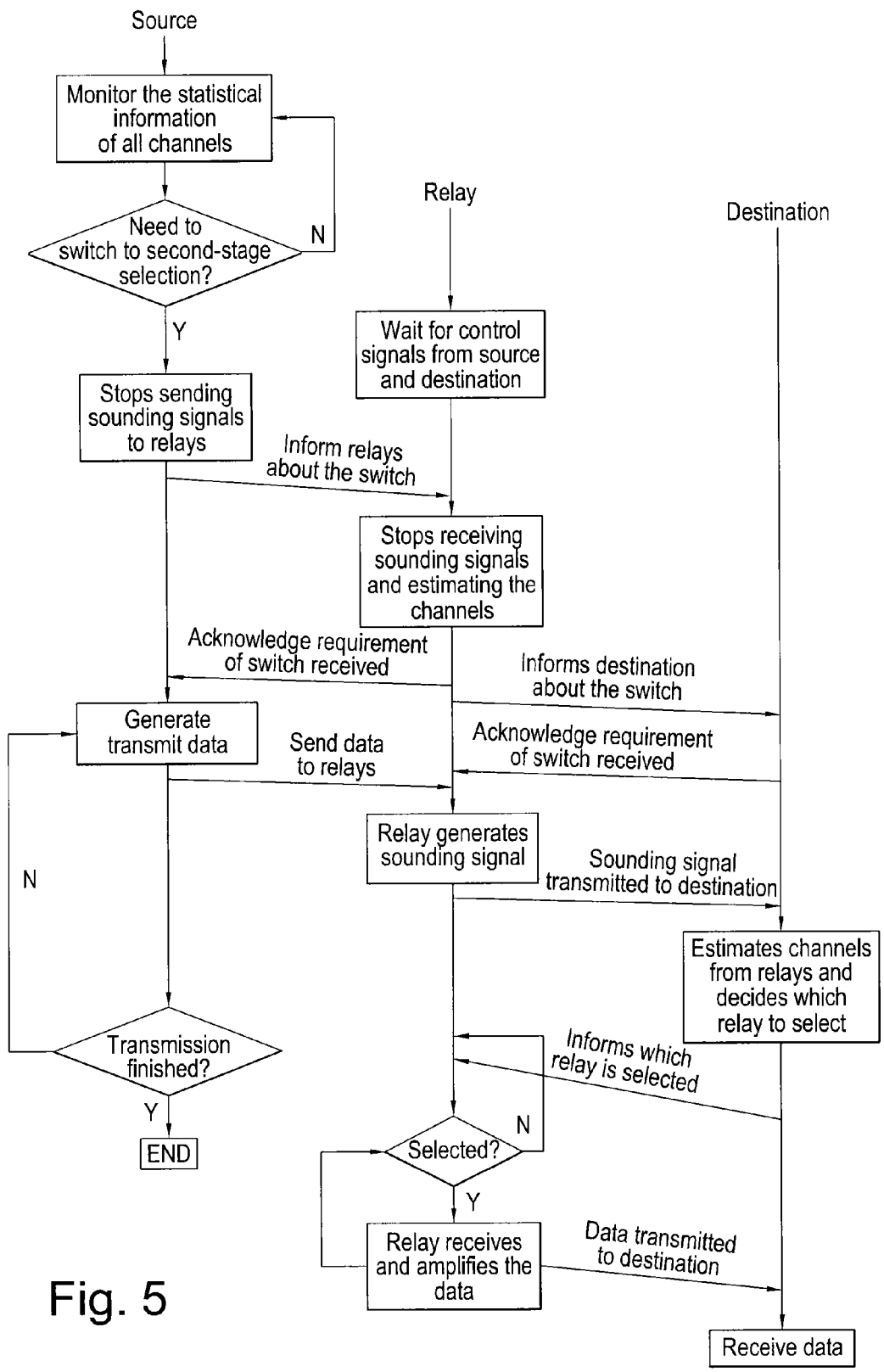
FIG. 5 is a flow diagram depicting an embodiment of switching from the first mode to the second mode of operation, when the source is monitoring channel characteristics.

1. Source monitoring the statistical information of all channels, switching from the first mode to the second mode:

When switching from the first mode to the second mode, the source stops sending sounding signals to the relays, informs the relays about the switch of the selection scheme so the relays stop estimating the channels from the source and stop feeding back the estimated channels to the source. Instead, the relays inform the destination about the switch of the selection scheme, and send sounding signals to the destination, the destination then estimates the channels from the relays, makes a decision of which relay to select, either feedbacks this information to the relays so they send the data or stay inactive, or simply receives the signal from the selected relay if the channels from relays are orthogonal. A figure illustrating the handover from the first mode to the second mode is given in FIG. 5.

2. Relays monitoring the statistical information of all channels, switching from the first mode to the second mode:

It follows a similar procedure as that in case 1 except that the relays need to inform the source to stop sending sounding signals and can at the same time send sounding signals to the destination and requests the destination to estimate the channel and perform selection.

3. Destination monitoring the statistical information of all channels, switching from the first mode to the second mode:

It follows a similar procedure as that in case 1 and 2 except that the destination needs to inform the relays or the source about the switch for them to take actions accordingly.

Figure 6:
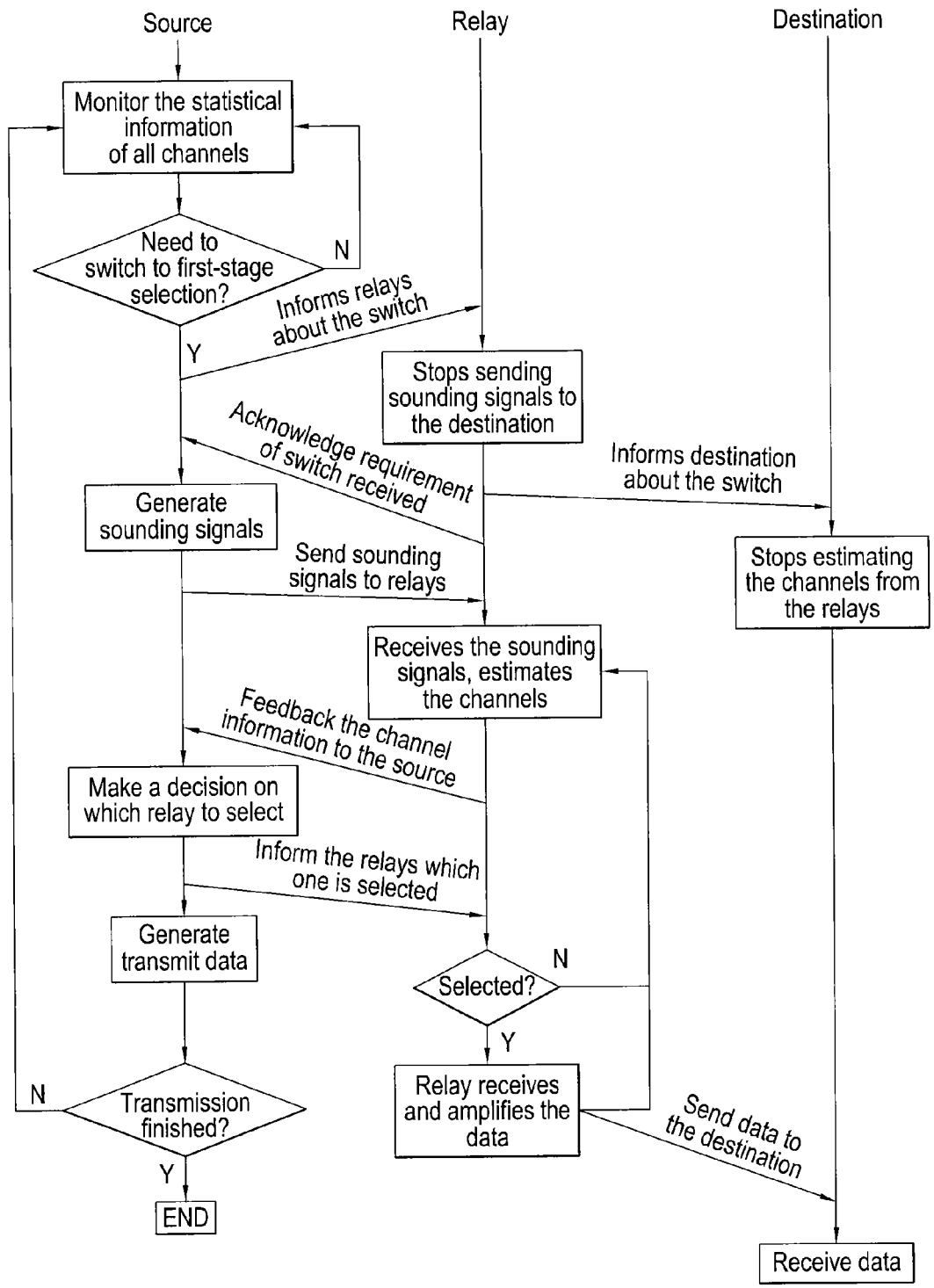
FIG. 6 is a flow diagram depicting an embodiment of switching from a second mode of operation to the first mode selection, when the source is monitoring channel characteristics.

4. Source monitoring the statistical information of all channels, switching from the second mode to the first mode:

The source informs the relays about the switch of the selection scheme, sends sounding signals to relays for them to estimate the channel and feedback CSI to the source (in some scenarios when relays are allowed to cooperate, they can determine which relay should be selected and send back the ID of the chosen relay to the source), the source then makes a decision about which relay to select, either transmits to that relay through orthogonal channels or broadcast to all relays but informs the relays about the results of the selection. Then either the relay that received the signal or the relay that is selected forwards the signal to the destination. A figure illustrating the switch process is given in FIG. 6.

5. Relays monitoring the statistical information of all channels, switching from the second mode to the first mode:

It follows the similar procedure as described in case 4 except that the relays now need to request the source to send sounding signals so that they can estimate the channel.

6. Destination monitoring the statistical information of all channels, switching from the second mode to the first mode:

The destination informs the relays the switch of the selection scheme, and the rest follows as in case 5.

Possible applications of the wireless communication apparatus, method and systems of the described embodiments include M2M communications (smart gird, wireless sensor networks, e-Health), LTE and WiMax (last meter relay stations).

From the above description is seen that although relay selection is performed according to instantaneous channel state information, the decision on whether to perform the first mode or the second mode is made according to varying channel characteristics such as changing channel statistical information. Since the channel statistical information changes much slower than the instantaneous channel state information, the relay, once selected (not selected), can stay active (inactive) for a relatively longer time.

Although the Embodiments focus on the switch between forward selection and backward selection, it is understood that the wireless communication apparatus may also be configured to select the mode of operation as being a further mode such as a global selection mode, where the relay is selected to minimize the end-to-end SNR taking into consideration channel characteristics in both hops. It is known that such a global selection always yields the smallest outage probability, with the highest complexity and feedback requirements. Therefore, the mode determining means may choose to use global selection when all CSI are available and reliability is the primary goal, regardless of the system cost and complexity. However, when both first and second can satisfy the required outage performance, the mode determining means is preferably configured to switch between the first and second mode to achieve the required outage performance at a reasonable system cost.

Whilst certain embodiments have been described, these embodiments have been presented by way of example only, and are not intended to limit the scope of the inventions. Indeed, the novel devices, methods and products described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A wireless communications apparatus configured to operate as one of a source node, a relay node or a destination node in a network comprising a plurality of source nodes, relay nodes and destination nodes, said network configured to support dual-hop communication using one of said relay nodes to intercede between one of said source nodes and one of said destination nodes, the apparatus comprising:

a decision node operable to determine a mode of operation for selecting a relay node to relay a signal emitted by an intended source node, the decision node being operable to determine said mode of operation on the basis of channel characteristics including statistical channel information collected from a collecting node, and further operable to change the determined mode of operation to a different mode in the event that the channel characteristics change;

said mode of operation for selecting the relay node being one of a first mode and a second mode, where in the first mode, said relay node is selected on the basis of channel characteristics between the intended source node and each relay node, and in the second mode, said relay node is selected on the basis of channel characteristics between each relay node and an intended destination node;

wherein said decision node is operable to determine that the mode of operation is the first mode in the event that a criterion is satisfied, and to otherwise determine that the mode of operation is the second mode, and is further operable to switch from the first mode to the second mode in the event that said criterion is no longer satisfied or to switch from the second mode to the first mode in the event that said criterion is satisfied;

wherein when all channels experience Nakagami-m fading, the criterion is given by:

if $d_1 > d_2$ then the mode of operation is determined as the first mode by the decision node, otherwise the mode of operation is determined as the second mode;

where d1 and d2 are the diversity orders due to the first mode and second mode respectively, and are given by:

$$d_1 = \min\left(\sum_{n=1}^{N} m_{1n}, m_{21}, m_{22}, \ldots m_{2N}\right)$$

$$d_2 = \min\left(\sum_{n=1}^{N} m_{2n}, m_{11}, m_{12}, \ldots m_{1N}\right)$$

where N is the number of relay nodes that can be selected, and $m_{1n}$, $m_{2n}$, are the shaping parameters of Nakagami-m fading channels to or from the nth relay, respectively, such that the mode of operation that provides a larger diversity gain is performed.

2. A wireless communications apparatus configured to operate as one of a source node, a relay node or a destination node in a network comprising a plurality of source nodes, relay nodes and destination nodes, said network configured to support dual-hop communication using one of said relay nodes to intercede between one of said source nodes and one of said destination nodes, the apparatus comprising:

a decision node operable to determine a mode of operation for selecting a relay node to relay a signal emitted by an intended source node, the decision node being operable to determine said mode of operation on the basis of channel characteristics including statistical channel information collected from a collecting node, and further operable to change the determined mode of operation to a different mode in the event that the channel characteristics change;

said mode of operation for selecting the relay node being one of a first mode and a second mode, where in the first mode, said relay node is selected on the basis of channel characteristics between the intended source node and each relay node, and in the second mode, said relay node is selected on the basis of channel characteristics between each relay node and an intended destination node;

wherein said decision node is operable to determine that the mode of operation is the first mode in the event that a criterion is satisfied, and to otherwise determine that the mode of operation is the second mode, and is further operable to switch from the first mode to the second mode in the event that said criterion is no longer satisfied or to switch from the second mode to the first mode in the event that said criterion is satisfied;

wherein when some channels experience Nakagami-m fading while others experience Rician fading, the criterion is given by:

if d1 or $d_2 \geq 1$, then the relay node is selected by the/an action node from the relay nodes where the channels from the intended source node to the relay nodes and the channels from the relay nodes to the intended destination node are Nakagami-Nakagami, if $d_1$ or $d_2 < 1$, then the relay node is selected by the/an action node from the relay nodes where the channels from the intended source node to the relay nodes and the channels from the relay nodes to the intended destination node are Rician-Rician;

such that, if $d_1 > d_2$ then the mode of operation is determined as the first mode by the decision node, otherwise the mode of operation is determined as the second mode;

where d1 and d2 are the diversity orders due to the first mode and the second mode respectively, and are given by:

$$d_1 = \min\left(\sum_{n=1}^{N} m_{1n}, m_{21}, m_{22}, \ldots m_{2N}\right)$$

$$d_2 = \min\left(\sum_{n=1}^{N} m_{2n}, m_{11}, m_{12}, \ldots m_{1N}\right)$$

where N is the number of relay nodes that can be selected, and $m_{1n}$, $m_{2n}$ are the shaping parameters of Nakagami-m fading channels to or from the nth relay, respectively.

3. The wireless communication apparatus according to claim 1 or 2 further comprising:

an action node for selecting a relay node to relay a signal emitted by the intended source node, the mode of operation of said relay mode selecting means being determined by the decision node on the basis of collected channel characteristics from a collecting node, the channel characteristics including statistical channel information, the mode of operation capable of being changed to a different mode by the decision node in the event that the collected channel characteristics change.

4. The wireless communication apparatus according to claim 3, further comprising:

a collecting node operable to collect channel characteristics between the intended source node and each relay node, and between each relay node and the intended destination node, said collecting node comprising a processor operable to process received signals to obtain statistical channel information, said statistical channel information being the collected channel characteristics for determining a mode of operation for selecting a relay node to relay a signal emitted by the intended source node, and for changing the mode of operation to a different mode if the collected channel characteristics change.

5. The wireless communication apparatus according to claim 1 or 2, wherein the criterion is given by:

If Pout_1<Pout_2, then the mode of operation is determined as the first mode by the decision node, otherwise the mode of operation is determined as the second mode;

where Pout_1 and Pout_2 are the outage probabilities due to the first mode and second mode, respectively.

6. The wireless communication apparatus according to claim 1 or 2, wherein:

said first mode of operation is performed by selecting a relay node such that the signal to noise ratio of the channel between the intended source node and the relay node is maximised; and said second mode of operation is performed by selecting a relay node such that the signal to noise ratio of the channel between the relay node and the intended destination node is maximised.

7. The wireless communication apparatus according to claim 4, wherein said collecting node is operable to collect said channel characteristics by sending pilot or sounding signals to assess each channel, said channel characteristics being determined by channel statistical information feedback received or by channel reciprocity, the intended source node, relay nodes and intended destination node being configured to exchange information regarding said channel characteristics with each other.

8. The wireless communication apparatus according to claim 1 or 2, wherein said plurality of relay nodes are each configured to amplify the signal emitted by the intended source node and then relay it to the intended destination node.

9. The wireless communication apparatus according to claim 8, wherein the apparatus includes the collecting node or the action node when configured to be a source node or a relay node.

10. The wireless communication apparatus according to claim 1 or 2, wherein the apparatus includes the collecting node when configured to be a destination node.

11. The wireless communication apparatus according to claim 1 or 2, further comprising:

a collecting node operable to collect channel characteristics between the intended source node and each relay node, and between each relay node and the intended destination node, said collecting node comprising a processor operable to process received signals to obtain statistical channel information, said statistical channel information being the collected channel characteristics for determining a mode of operation for selecting a relay node to relay a signal emitted by the intended source node, and for changing the mode of operation to a different mode if the collected channel characteristics change.

12. The wireless communication apparatus according to claim 1 or 2, wherein said decision node is operable to determine that the mode of operation is the first mode in the event that a criterion is satisfied, and to otherwise determine that the mode of operation is the second mode, and is further operable to switch from the first mode to the second mode in the event that said criterion is no longer satisfied or to switch from the second mode to the first mode in the event that said criterion is satisfied.

13. A communication system comprising a network having a plurality of source nodes, relay nodes and destination nodes configured to support dual-hop communication using one of said relay nodes to intercede between one of said source nodes and one of said destination nodes, one or more of said source nodes, relay nodes and destination nodes configured as a wireless communications apparatus comprising,
a decision node operable to determine a mode of operation for selecting a relay node to relay a signal emitted by the intended source node, the decision node being operable to determine said mode of operation on the basis of collected channel characteristics from a collecting node, the channel characteristics including statistical channel information, and being further operable to change the determined mode of operation to a different mode if the channel characteristics change,
wherein the mode of operation for selecting the relay node is one of a first mode and a second mode, where
in the first mode, said relay node is selected on the basis of channel characteristics between the intended source node and each relay node, and
in the second mode, said relay node is selected on the basis of channel characteristics between each relay node and the intended destination node;
wherein said decision node is operable to determine that the mode of operation is the first mode in the event that a criterion is satisfied, and to otherwise determine that the mode of operation is the second mode, and is further operable to switch from the first mode to the second mode in the event that said criterion is no longer satisfied or to switch from the second mode to the first mode in the event that said criterion is satisfied;
wherein when all channels experience Nakagami-m fading, the criterion is given by:
If $d_1 > d_2$ then the mode of operation is determined as the first mode by the decision node, otherwise the mode of operation is determined as the second mode;
where d1 and d2 are the diversity orders due to the first mode and second mode respectively, and are given by:

$$d_1 = \min\left(\sum_{n=1}^{N} m_{1n}, m_{21}, m_{22}, \ldots m_{2N}\right)$$

$$d_2 = \min\left(\sum_{n=1}^{N} m_{2n}, m_{11}, m_{12}, \ldots m_{1N}\right)$$

where N is the number of relay nodes that can be selected, and $m_{1n}$, $m_{2n}$ are the shaping parameters of Nakagami-m fading channels to or from the nth relay, respectively, such that the mode of operation that provides a larger diversity gain is performed.

14. A wireless communications apparatus configured to operate as one of a source node, a relay node or a destination node in a network comprising a plurality of source nodes, relay nodes and destination nodes configured to support dual-hop communication using one of said relay nodes to intercede between one of said source nodes and one of said destination nodes, the apparatus comprising:
an action node for selecting a relay node to relay a signal emitted by the intended source node, the mode of operation of said relay mode selecting means being determined by a decision node on the basis of collected channel characteristics from a collecting node, the channel characteristics including statistical channel information, the mode of operation capable of being changed to a different mode by the decision node if the collected channel characteristics change;
wherein the mode of operation for selecting the relay node is one of a first mode and a second mode, where
in the first mode, said relay node is selected on the basis of channel characteristics between the intended source node and each relay node, and
in the second mode, said relay node is selected on the basis of channel characteristics between each relay node and the intended destination node;
wherein said decision node is operable to determine that the mode of operation is the first mode in the event that a criterion is satisfied, and to otherwise determine that the mode of operation is the second mode, and is further operable to switch from the first mode to the second mode in the event that said criterion is no longer satisfied or to switch from the second mode to the first mode in the event that said criterion is satisfied;
wherein when all channels experience Nakagami-m fading, the criterion is given by:
If $d_1 > d_2$ then the mode of operation is determined as the first mode by the decision node, otherwise the mode of operation is determined as the second mode;
where d1 and d2 are the diversity orders due to the first mode and second mode respectively, and are given by:

$$d_1 = \min\left(\sum_{n=1}^{N} m_{1n}, m_{21}, m_{22}, \ldots m_{2N}\right)$$

$$d_2 = \min\left(\sum_{n=1}^{N} m_{2n}, m_{11}, m_{12}, \ldots m_{1N}\right)$$

where N is the number of relay nodes that can be selected, and $m_{1n}$, $m_{2n}$ are the shaping parameters of Nakagami-m fading channels to or from the nth relay, respectively, such that the mode of operation that provides a larger diversity gain is performed.

15. A method of performing relay node selection for relaying one or more signals emitted from an intended source node to an intended destination node in a network having a plurality of source nodes, relay nodes and destination nodes configured to support dual-hop communication using one of said relay nodes to intercede between one of said source nodes and one of said destination nodes, the method being implemented in a communication system by at least one wireless communication apparatus configured to operate as one of a source node, a relay node or a destination node in a network comprising a plurality of source nodes, relay nodes and destination nodes, said network configured to support dual-hop communication using one of said relay nodes to intercede between one of said source nodes and one of said destination nodes, the at least one wireless communication apparatus comprising,
a decision node operable to determine a mode of operation for selecting a relay node to relay a signal emitted by an intended source node, the decision node being operable to determine said mode of operation on the basis of channel characteristics including statistical channel information collected from a collecting node, and further operable to change the determined mode of operation to a different mode in the event that the channel characteristics change, said method comprising the steps of:
a) selecting a relay node for relaying a signal emitted by the intended source node by determining a mode of operation on the basis of the collected channel characteristics between an intended source node and each relay node and between an intended destination node and each relay node, the channel characteristics including statistical channel information from received signals, the mode of operation being one of a first mode and a second mode, where in the first mode, the relay node is selected on the basis of said channel characteristics between the intended source node and each relay node, and in the second mode, the relay is selected on the basis of said channel characteristics between each relay node and the intended destination node;

b) changing the determined mode of operation if the collected channel characteristics between the intended source node and each relay node changes, or if the channel characteristics between the intended destination node and each relay node changes, or if the collected channel characteristics between the intended source node and each relay node changes and the channel characteristics between the intended destination node and each relay node changes;

wherein said decision node is operable to determine that the mode of operation is the first mode in the event that a criterion is satisfied, and to otherwise determine that the mode of operation is the second mode, and is further operable to switch from the first mode to the second mode in the event that said criterion is no longer satisfied or to switch from the second mode to the first mode in the event that said criterion is satisfied;

wherein when all channels experience Nakagami-m fading, the criterion is given by:

If $d_1 > d_2$ then the mode of operation is determined as the first mode by the decision node, otherwise the mode of operation is determined as the second mode;

where d1 and d2 are the diversity orders due to the first mode and second mode respectively, and are given by:

$$d_1 = \min\left(\sum_{n=1}^{N} m_{1n}, m_{21}, m_{22}, \ldots m_{2N}\right)$$

$$d_2 = \min\left(\sum_{n=1}^{N} m_{2n}, m_{11}, m_{12}, \ldots m_{1N}\right)$$

where N is the number of relay nodes that can be selected, and $m_{1n}$, $m_{2n}$ are the shaping parameters of Nakagami-m fading channels to or from the nth relay, respectively, such that the mode of operation that provides a larger diversity gain is performed.

16. A communication system comprising a network having a plurality of source nodes, relay nodes and destination nodes configured to support dual-hop communication using one of said relay nodes to intercede between one of said source nodes and one of said destination nodes, one or more of said source nodes, relay nodes and destination nodes configured as a wireless communications apparatus comprising, a decision node operable to determine a mode of operation for selecting a relay node to relay a signal emitted by the intended source node, the decision node being operable to determine said mode of operation on the basis of collected channel characteristics from a collecting node, the channel characteristics including statistical channel information, and being further operable to change the determined mode of operation to a different mode if the channel characteristics change, wherein the mode of operation for selecting the relay node is one of a first mode and a second mode, where in the first mode, said relay node is selected on the basis of channel characteristics between the intended source node and each relay node, and in the second mode, said relay node is selected on the basis of channel characteristics between each relay node and the intended destination node;

wherein said decision node is operable to determine that the mode of operation is the first mode in the event that a criterion is satisfied, and to otherwise determine that the mode of operation is the second mode, and is further operable to switch from the first mode to the second mode in the event that said criterion is no longer satisfied or to switch from the second mode to the first mode in the event that said criterion is satisfied;

wherein when some channels experience Nakagami-m fading while others experience Rician fading, the criterion is given by:

if d1 or $d_2 >= 1$, then the relay node is selected by the/an action node from the relay nodes where the channels from the intended source node to the relay nodes and the channels from the relay nodes to the intended destination node are Nakagami-Nakagami, if $d_1$ or $d_2 < 1$, then the relay node is selected by the/an action node from the relay nodes where the channels from the intended source node to the relay nodes and the channels from the relay nodes to the intended destination node are Rician-Rician;

such that, if $d_1 > d_2$ then the mode of operation is determined as the first mode by the decision node, otherwise the mode of operation is determined as the second mode;

where d1 and d2 are the diversity orders due to the first mode and the second mode respectively, and are given by:

$$d_1 = \min\left(\sum_{n=1}^{N} m_{1n}, m_{21}, m_{22}, \ldots m_{2N}\right)$$

$$d_2 = \min\left(\sum_{n=1}^{N} m_{2n}, m_{11}, m_{12}, \ldots m_{1N}\right)$$

where N is the number of relay nodes that can be selected, and $m_{1n}$, $m_{2n}$ are the shaping parameters of Nakagami-m fading channels to or from the nth relay, respectively.

17. A wireless communications apparatus configured to operate as one of a source node, a relay node or a destination node in a network comprising a plurality of source nodes, relay nodes and destination nodes configured to support dual-hop communication using one of said relay nodes to intercede between one of said source nodes and one of said destination nodes, the apparatus comprising:

an action node for selecting a relay node to relay a signal emitted by the intended source node, the mode of operation of said relay mode selecting means being determined by a decision node on the basis of collected channel characteristics from a collecting node, the channel characteristics including statistical channel information, the mode of operation capable of being changed to a different mode by the decision node if the collected channel characteristics change;

wherein the mode of operation for selecting the relay node is one of a first mode and a second mode, where in the first mode, said relay node is selected on the basis of channel characteristics between the intended source node and each relay node, and in the second mode, said relay node is selected on the basis of channel characteristics between each relay node and the intended destination node;

wherein said decision node is operable to determine that the mode of operation is the first mode in the event that a criterion is satisfied, and to otherwise determine that the mode of operation is the second mode, and is further operable to switch from the first mode to the second mode in the event that said criterion is no longer satisfied or to switch from the second mode to the first mode in the event that said criterion is satisfied;

wherein when some channels experience Nakagami-m fading while others experience Rician fading, the criterion is given by:

if $d_1$ or $d_2 \geq 1$, then the relay node is selected by the/an action node from the relay nodes where the channels from the intended source node to the relay nodes and the channels from the relay nodes to the intended destination node are Nakagami-Nakagami, if $d_1$ or $d_2 < 1$, then the relay node is selected by the/an action node from the relay nodes where the channels from the intended source node to the relay nodes and the channels from the relay nodes to the intended destination node are Rician-Rician;

such that, if $d_1 > d_2$ then the mode of operation is determined as the first mode by the decision node, otherwise the mode of operation is determined as the second mode;

where d1 and d2 are the diversity orders due to the first mode and the second mode respectively, and are given by:

$$d_1 = \min\left(\sum_{n=1}^{N} m_{1n}, m_{21}, m_{22}, \ldots m_{2N}\right)$$

$$d_2 = \min\left(\sum_{n=1}^{N} m_{2n}, m_{11}, m_{12}, \ldots m_{1N}\right)$$

where N is the number of relay nodes that can be selected, and $m_{1n}$, $m_{2n}$ are the shaping parameters of Nakagami-m fading channels to or from the nth relay, respectively.

18. A method of performing relay node selection for relaying one or more signals emitted from an intended source node to an intended destination node in a network having a plurality of source nodes, relay nodes and destination nodes configured to support dual-hop communication using one of said relay nodes to intercede between one of said source nodes and one of said destination nodes, the method being implemented in a communication system by at least one wireless communication apparatus configured to operate as one of a source node, a relay node or a destination node in a network comprising a plurality of source nodes, relay nodes and destination nodes, said network configured to support dual-hop communication using one of said relay nodes to intercede between one of said source nodes and one of said destination nodes, the at least one wireless communication apparatus comprising, a decision node operable to determine a mode of operation for selecting a relay node to relay a signal emitted by an intended source node, the decision node being operable to determine said mode of operation on the basis of channel characteristics including statistical channel information collected from a collecting node, and further operable to change the determined mode of operation to a different mode in the event that the channel characteristics change, said method comprising the steps of:

a) selecting a relay node for relaying a signal emitted by the intended source node by determining a mode of operation on the basis of the collected channel characteristics between an intended source node and each relay node and between an intended destination node and each relay node, the channel characteristics including statistical channel information from received signals, the mode of operation being one of a first mode and a second mode, where in the first mode, the relay node is selected on the basis of said channel characteristics between the intended source node and each relay node, and in the second mode, the relay is selected on the basis of said channel characteristics between each relay node and the intended destination node;

b) changing the determined mode of operation if the collected channel characteristics between the intended source node and each relay node changes, or if the channel characteristics between the intended destination node and each relay node changes, or if the collected channel characteristics between the intended source node and each relay node changes and the channel characteristics between the intended destination node and each relay node changes;

wherein said decision node is operable to determine that the mode of operation is the first mode in the event that a criterion is satisfied, and to otherwise determine that the mode of operation is the second mode, and is further operable to switch from the first mode to the second mode in the event that said criterion is no longer satisfied or to switch from the second mode to the first mode in the event that said criterion is satisfied;

wherein when some channels experience Nakagami-m fading while others experience Rician fading, the criterion is given by:

if $d_1$ or $d_2 \geq 1$, then the relay node is selected by the/an action node from the relay nodes where the channels from the intended source node to the relay nodes and the channels from the relay nodes to the intended destination node are Nakagami-Nakagami, if $d_1$ or $d_2 < 1$, then the relay node is selected by the/an action node from the relay nodes where the channels from the intended source node to the relay nodes and the channels from the relay nodes to the intended destination node are Rician-Rician;

such that, if $d_1 > d_2$ then the mode of operation is determined as the first mode by the decision node, otherwise the mode of operation is determined as the second mode;

where d1 and d2 are the diversity orders due to the first mode and the second mode respectively, and are given by:

$$d_1 = \min\left(\sum_{n=1}^{N} m_{1n}, m_{21}, m_{22}, \ldots m_{2N}\right)$$

$$d_2 = \min\left(\sum_{n=1}^{N} m_{2n}, m_{11}, m_{12}, \ldots m_{1N}\right)$$

where N is the number of relay nodes that can be selected, and $m_{1n}$, $m_{2n}$ are the shaping parameters of Nakagami-m fading channels to or from the nth relay, respectively.

* * * * *